United States Patent [19]

Watanabe

[11] 4,159,869

[45] Jul. 3, 1979

[54] CURSOR FOR USE IN MICROFILM READER

[75] Inventor: Yutaka Watanabe, Hon, Japan

[73] Assignee: Minolta Camera Kabushiki Kaisha, Osaka, Japan

[21] Appl. No.: 836,326

[22] Filed: Sep. 26, 1977

[30] Foreign Application Priority Data

Oct. 1, 1976 [JP] Japan ............................ 51-133182[U]

[51] Int. Cl.² ...................... G03B 21/00; B43L 13/04
[52] U.S. Cl. ......................................... 353/122; 33/437
[58] Field of Search ................... 353/40, 41, 42, 122; 116/DIG. 15; 33/76 R

[56] References Cited

U.S. PATENT DOCUMENTS

| 71,178 | 11/1867 | Imbach | 33/149 G |
| 456,553 | 7/1891 | Carr | 33/76 R |
| 695,565 | 3/1902 | Knapp | 33/153 C |
| 1,115,333 | 10/1914 | Pease | 33/76 R |
| 1,459,792 | 6/1923 | Nilant | 33/79 R |
| 2,848,923 | 8/1958 | Diefenbach | 33/76 R |
| 3,882,603 | 5/1975 | Distel | 33/79 A |
| 4,102,050 | 7/1978 | Roth | 33/76 R |

FOREIGN PATENT DOCUMENTS 474702 10/1952 Italy ............................ 33/76 R

*Primary Examiner*—Steven L. Stephan
*Attorney, Agent, or Firm*—Wolder, Gross & Yavner

[57] ABSTRACT

A microfilm reader includes a vertical rectangular projection screen surrounded by a rectangular frame. A cursor mechanism is separably provided which includes a vertical rail extending along a side edge of the screen between the frame top and bottom legs and slidably frictionally engaging a support member to which a cursor member is swingably mounted for angular adjustment in a plane parallel to the screen. The cursor member is releasably frictionally retained in its preset angular position and the support member is releasably frictionally retained in its preset vertical position. Cam means including a rotatable or slidable knob angularly adjusts the cursor member or the cursor member is directly turned by a knob attached to a pivot secured to the cursor member. The rail may be replaced by a side wall of the reader which is formed of magnetic material and the support member may carry a permanent magnet slidably securing it to the side wall.

6 Claims, 12 Drawing Figures

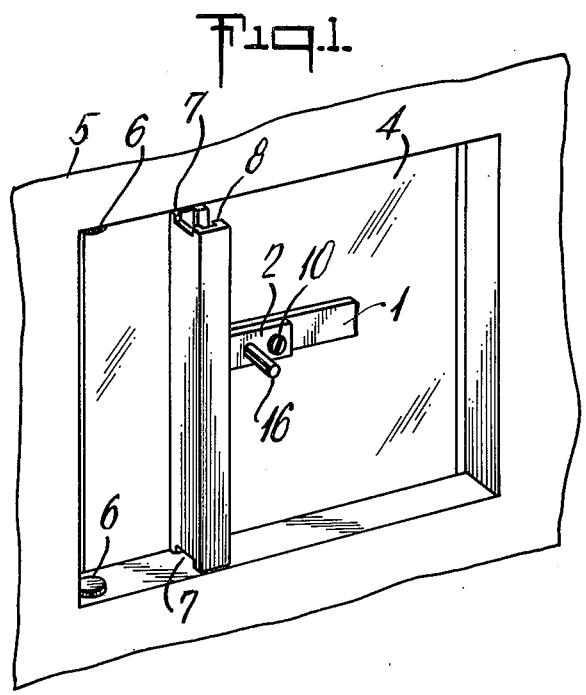
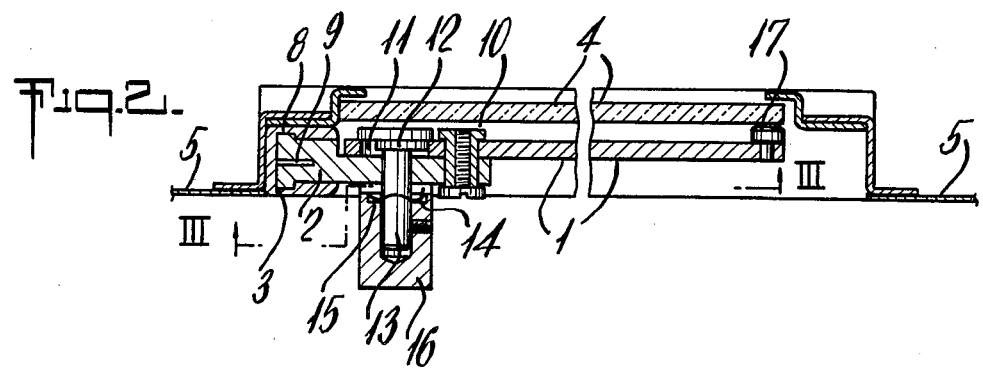
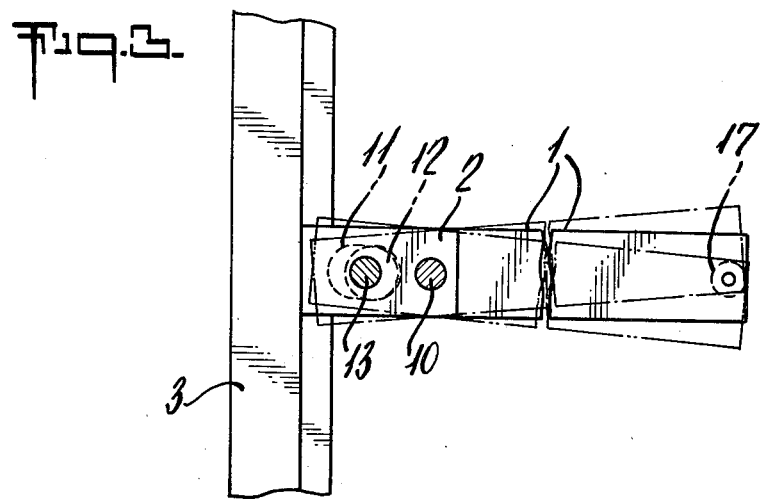

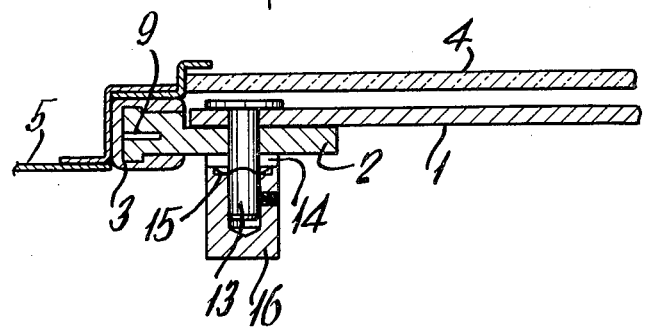
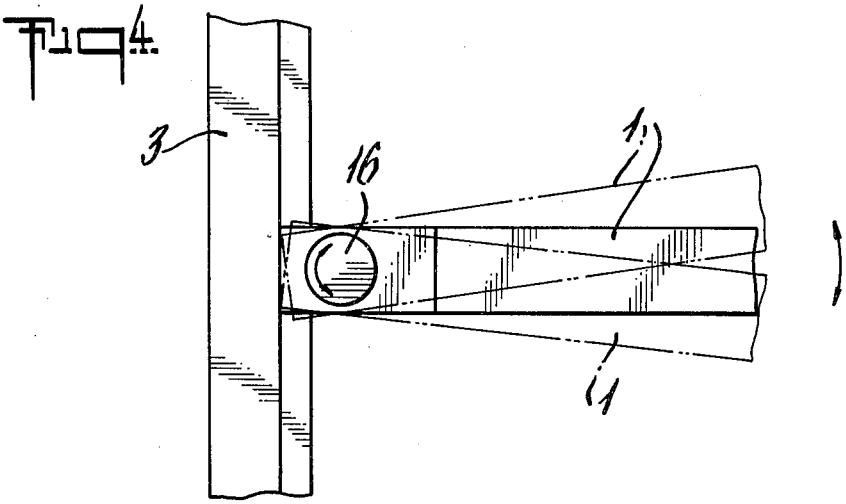

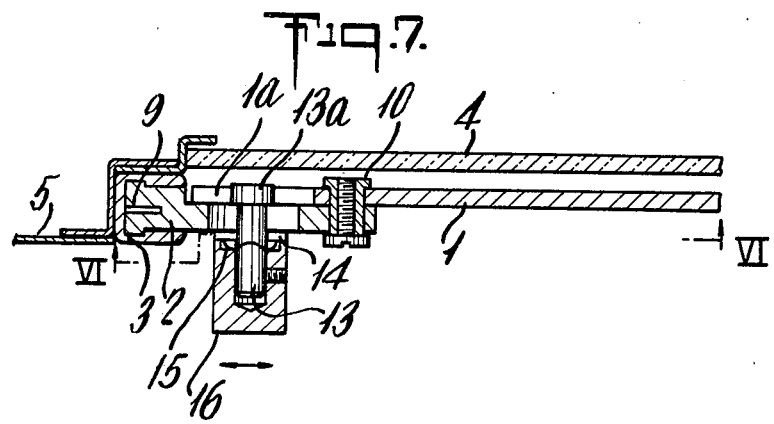
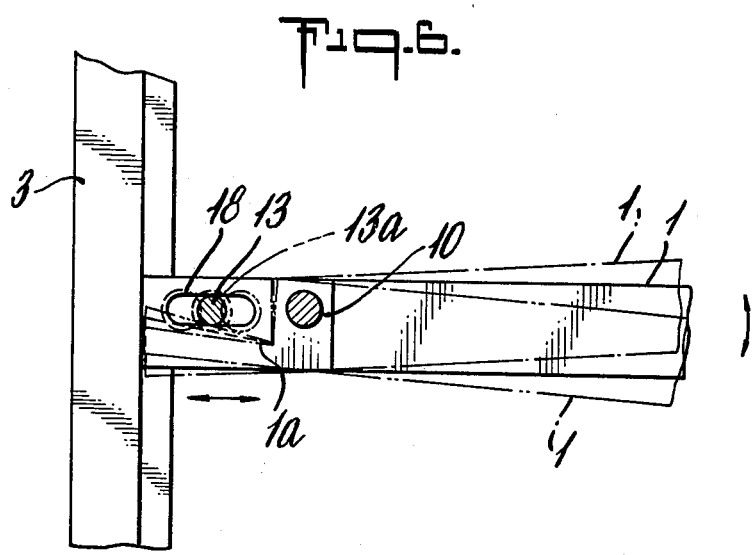

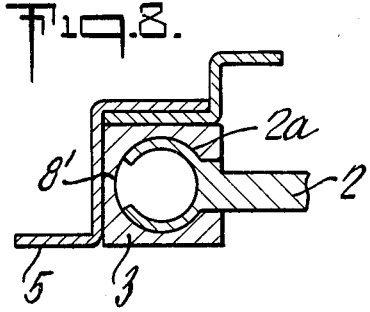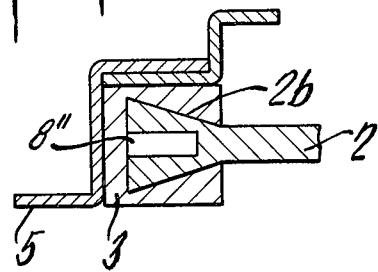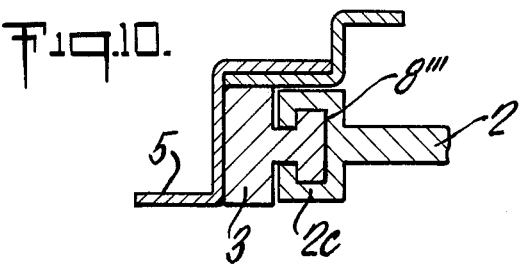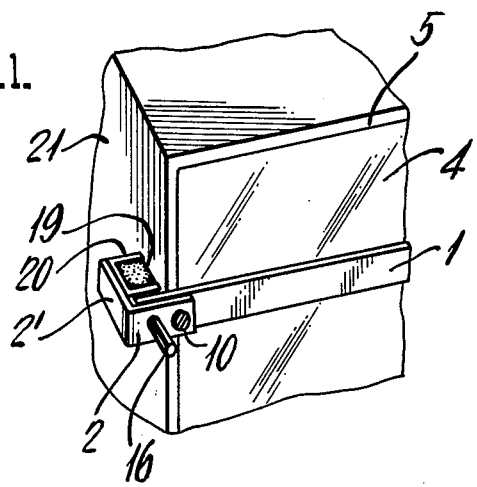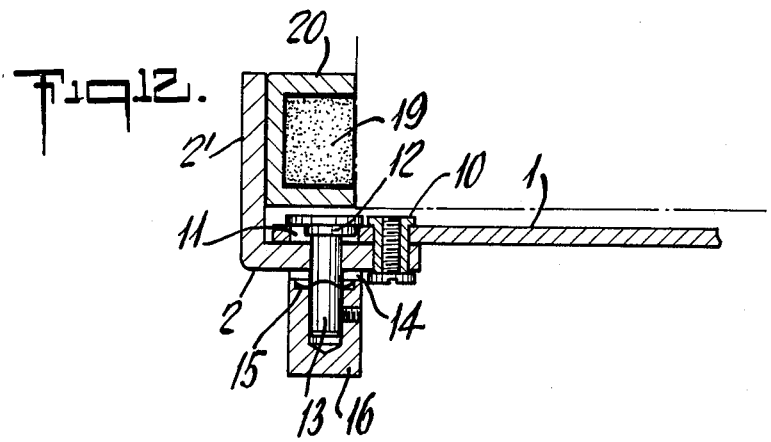

CURSOR FOR USE IN MICROFILM READER

BACKGROUND OF THE INVENTION

The present invention relates generally to improvements in microfilm readers and it relates more particularly to an improved cursor mechanism for facilitating the reading of successive parallel lines of an image projected on a microfilm reader screen even where these lines are not precisely lateral.

The convention cursor mechanism associated with a microfilm reader generally includes a vertically adjustable cursor bar which is angularly fixed so as to be laterally horizontal so that when it is vertically moved it is always horizontal and parallel to itself. While such a cursor mechanism is highly satisfactory where the lines of the image projected on the viewing screen, for example, lines of typography are always precisely horizontal and parallel to the upper and lower edges of the viewing screen, such a mechanism is unsuitable and less than satisfactory when applied to viewed images whose parallel lines are inclined to the horizontal. Since it frequently occurs that the lines of a projected image are inclined to the horizontal, for example, in the case where the film itself is projected in an inclined manner or the photographed original is inclined, the conventional cursor mechanism leaves much to be desired since it fails to align with the image lines in many cases and hence fails to achieve its proper and intended function.

SUMMARY OF THE INVENTION

It is a principal object of the present invention to provide an improved microfilm reader.

Another object of the present invention is to provide an improved cursor mechanism for use with a microfilm reader.

Still another object of the present invention is to provide an improved microfilm reader cursor mechanism which facilitates the reading of parallel image lines even when these lines are inclined to the horizontal or the parallel top and bottom edges of the viewing screen.

A further object of the present invention is to provide a cursor mechanism in which the cursor bar may be removably provided externally of the viewing screen thereby preventing the cursor bar interfering with the use of the microfilm reader.

Still a further object of the present invention is to provide a mechanism of the above nature characterized by its reliability, simplicity, ruggedness, ease of operation and application and great versatility and adaptability.

The above and other objects of the present invention will become apparent from a reading of the following description taken in conjunction with the accompanying drawings which illustrate preferred embodiments thereof.

The present invention contemplates the provision of a cursor mechanism for use in a microfilm reader, whose cursor bar is moved in parallel relation along a screen surface of a microfilm reader, characterized in that the cursor comprises: a cursor bar; a support member for rotatably supporting the cursor bar; a guide member for holding the support member in a movable up and down manner; and an angle adjusting means for turning the cursor bar and holding it in position to which it is turned, for allowing the angular adjustment of the cursor bar.

The improved cursor mechanism overcomes the drawbacks and disadvantages of the microfilm reader cursor mechanisms heretofore proposed and is simple, rugged and highly reliable and of great versatility and adaptability and easy to use and apply.

BRIEF DESCRIPTION OF THE DRAWINGS

FIG. 1 is a fragmentary front perspective view of the viewing screen of a microfilm reader including a cursor device in accordance with the present invention;

FIG. 2 is a transverse cross-sectional view thereof;

FIG. 3 is a sectional view taken along line III—III of FIG. 2 the cursor member being shown by broken lines in angularly adjusted positions;

FIG. 4 is a fragmentary front elevational view of another embodiment of the present invention;

FIG. 5 is a transverse cross-sectional view thereof;

FIGS. 6 and 7 are views similar to FIGS. 4 and 5 of still another emobdiment of the present invention;

FIGS. 8, 9 and 10 are transverse sectional views showing respective modifications of the cursor vertically adjustable support assembly;

FIG. 11 is a fragmentary front perspective view of a further embodiment of the present invention; and FIG. 12 is a transverse cross-sectional view thereof.

DESCRIPTION OF THE PREFERRED EMBODIMENTS

Referring now to the drawings, particularly FIGS. 1 to 3 thereof which illustrate a preferred embodiment of the present invention, the reference numeral 1 generally designates an elongated linear guide member or cursor bar which is vertically slideably mounted on or attached to a vertical cursor rail or pole 3 by means of a slide or support member 2.

Removable guide pawls 6 are provided on the upper and lower leg members of a frame 5 of a microfilm image projection screen 4 at the ends thereof proximate a side leg of the frame. Cursor rail or pole 3 is channel-shaped and is formed with grooves 7, 7 at the top and bottom of its cross-web allowing the removal of rail 3 from frame 5. Thus, cursor rail 3 may be attached to frame 5 by bringing guide cams or pawls 6, 6 into engagement with grooves 7.

The cursor rail or pole 3 is formed with a 'T' shaped channel 8 along the length thereof. The tip portion of cursor bar support member 2 is shaped so as to fit in the 'T' shaped channel 8. A vertical medial slot 9 is formed in the tip or enlarged head portion of support member 2 to divide the head into a pair of resilient legs whereby support member 2 may vertically slide along pole 3 under the influence of a manually applied force by reason of slot 9 and a portion of pole 3 which is fitted therein.

As best seen in FIGS. 2 and 3, cursor bar 1 is rockably or rotatably mounted to support member 2 by means of pivot 10 located on support member 2. An elongated hole 11 is provided in a portion of the cursor bar 1, sidewise of pivot 10, with the major axis of the hole being in alignment with the center of pivot 10.

A circular eccentric cam 12 engages the elongated hole 11. A shank 13 eccentrically perpendicularly projects from eccentric cam 12 and extends through a corresponding bore in supporting member 2 in outwardly projecting relation thereto. A knob 16 is secured to the end of shank 13 and frictionally engages a face of support member 2 through the medium of friction cushion 14 and spring 15. Friction cushion 14 and spring 15 afford a suitable frictional force to cam 12, when the cam 12 is rotated, so that the cam 12 is not normally turned due to the gravity of the cursor bar.

A low friction slide member 17 is secured to the inside face of the tip portion of the cursor bar 1, thereby preventing any damages to the surface of screen 4 by the tip portion of the cursor bar.

Normally, the cursor of the aforesaid arrangement is maintained horizontally and moved up and down for alignment with a selected line of the screen projected image. In case an image projected onto the screen is inclined due to the correspondingly inclined projection of a microfilm, or due to the inclined position of an original when the picture is taken, the knob 16 is turned so as to turn cursor bar 1 about pivot 10 by means of cam 12 for alignment with an inclined line. After being turned, cam 12 is rigidly held in position by means of the friction cushion 14 and spring 15 which define a slipping braking clutch so that the cursor bar 1 may be maintained in alignment with a preselected line of the image.

In FIGS. 4 and 5 there is shown a modification of the above described first embodiment in which the shank 13 of the adjusting knob and the pivot 10 for the cursor bar form a common member and are jointly used.

As best seen in FIG. 5, the shank 13 for the knob 16 is secured to cursor bar 1 by means of screws or other expedient. In this case, the rotation of knob 16 effects the angular adjustment of cursor bar. FIGS. 6 and 7 illustrate a modification of the first described embodiment in which the rotary type adjusting knob 16 is modified into a slide type knob. As shown, an elongated hole or slot 18 is provided in the support member 2 and slideably engages the shank 13 of the knob 16 in a laterally movable manner, in a position between pivot 10 and cursor pole 3. An inclined surface 1a is provided at the rear end portion of the cursor bar in a position opposed to the elongated hole 18. A head portion 13a of shank 13 of larger diameter than that of shank 13 and is so designed as to engage the inclined surface 1a of the cursor bar, due to the rotation of cursor bar 1 under the influence of gravity.

In the last described mechanism when adjusting knob 16 is moved laterally horizontally, the cursor bar 1 is turned. When the shank 13 is positioned in the center of elongated hole 18, the cursor bar 1 is oriented in the horizontal direction at a right angle to pole 3. The other parts of the cursor mechanism is similar to that of the first described embodiment.

FIGS. 8 to 10 show modifications of the first embodiment particularly in the structure of the sliding support mechanism of the cursor bar support member 2 on the cursor pole 3.

As shown in FIG. 8 the inner end 2a of the cursor bar support member 2 is of C-shape configuration engaging the corresponding channel 8' in pole 3. The C-shaped tip portion 2a is slidingly resiliently fitted in channel 8' to permit the vertical sliding thereof under the application of a sufficient manual force.

As shown in FIG. 9, the channel 8" is of a trapezoid shape, while the tip 26 of support member 2 is formed into a reverse wedge shape 26 having a longitudinal medium slit.

In the embodiment illustrated in FIG. 10, cursor pole 3 is provided with guide tracks of 'T' shape transverse cross-section 8''' while the tip portion 2c of the cursor bar support member is of the configuration of a reverse 'C' and slideably engages rail 8''' but is normally retained in preset position. Thus reverse 'C' shaped tip portion 2c may be slidingly resiliently fitted on track 8'''.

FIGS. 11 and 12 show a modification of the first described embodiment in which the mechanism by which the cursor bar support member 2 is vertically slidingly supported is modified into a known magnetic type mechanism.

As best seen in FIG. 12, an extended inner tip portion 2' of the cursor bar support member 2 is formed into a 'L'-shape and a 'U'-shaped plate 20 of magnetic material having a magnet 19 secured to the cross-web thereof is attached to the tip portion rearwardly projection leg. As seen in FIG. 11, the cursor is attached to side surface 21 of a microfilm reader by means of magnet 19. The other parts of the present embodiment are similar to those of the first described embodiment, i.e., the angular adjustment may be made by turning the adjusting knob 16.

In the present embodiment, side surface 21 of the reader serves to slidingly hold the cursor for vertical manual adjustment, the corresponding side wall being of magnetic material.

Among the advantages of the present improved cursor mechanism is that since the cursor bar is supported by the support member in an angularly adjustable manner, even if an image projected onto the screen surface is inclined, the cursor may be correspondingly inclined so as to align with a line of the image, thus presenting high practicability. Further, the cursor is provided in a removable manner from the screen surface, so that the cursor bar is no longer an obstacle, when the cursor is not used. Moreover, the cursor bar, its angle adjusting member, and the guide portion are provided separately, and these are coupled together for use. As a result, when two cursor bars are required, an auxiliary cursor bar may be used by being coupled to the cursor pole or the microfilm reader side wall.

While there have been described and illustrated preferred embodiments of the present invention, it is apparent that numerous alterations, omissions and additions may be made without departing from the spirit thereof.

I claim:

1. A cursor mechanism for use in a microfilm reader having a vertically extending rectangular projection screen and a rectangular frame surrounding said screen, comprising:
   a cursor member extending laterally across and proximate to and parallel to the plane of said screen and having a longitudinal opening proximate an end thereof;
   a support member swingably mounting said cursor member by means of a pivot and having a bore therein;
   a cursor pole provided along one side of said screen frame for vertically slidably supporting said support member; and
   an angle adjusting means for adjusting the angle of said cursor member;
   wherein said angle adjusting means comprises, a pivot member rotatably projecting through said support member bore, a cam member engaging said longitudinal opening and affixed to one end of said pivot member, a knob affixed to the other end of said pivot member for turning said cam member and adjusting the angle of said cursor member and means including a friction cushion and a loading spring entrapped between the confronting faces of said knob and said support member for frictionally preventing the rotation of said cam member by said cursor member under the influence of gravity while permitting the manual rotation of said knob to turn said cam member and adjust the angle of said cursor member.

2. The cursor mechanism of claim 1 including a low friction slide member located on the inside of said cursor member proximate the outer end thereof for preventing damage to the surface of said screen by the outer end portion of said cursor member.

3. A cursor mechanism for use in a microfilm reader having a vertically extending rectangular projection screen and a rectangular frame surrounding said screen, comprising:
   a cursor member extending laterally across and proximate to and parallel to the plane of said screen and having a longitudinal cam edge proximate one end thereof;
   a support member swingably mounting said cursor member by means of a pivot and having a longitudinal slot;
   a cursor pole provided along one side of said screen frame for vertically slidably supporting said support member; and
   an angle adjusting means for adjusting the angle of said cursor member;
   wherein said angle adjusting means comprises a slide member slidable along and projecting through said longitudinal slot, a transmission member engaging said cam edge and affixed to one end of said slide member, a knob affixed to the other end of said slide member for shifting said slide and transmission members and adjusting the angle of said cursor member, and means including a friction cushion and a loading spring entrapped between the confronting faces of said knob and said support member for frictionally preventing the sliding movement of said transmission member by said cursor member under the influence of gravity while permitting the manual sliding movement of said knob to slide said transmission member and adjust the angle of said cursor member.

4. The cursor mechanism of claim 3 including a low friction slide member located on the inside of said cursor member proximate the outer end thereof for preventing damage to the surface of said screen by the outer end portion of said cursor member.

5. A cursor mechanism for use in a microfilm reader having a vertically extending rectangular projection screen and a rectangular frame surrounding said screen, comprising:
   a cursor member extending laterally across and proximate to and parallel to the plane of said screen and having a longitudinal opening proximate an end thereof;
   a support member swingably mounting said cursor member by means of a pivot and having a bore therein;
   a cursor pole provided along one side of said screen frame for vertically slidably supporting said support member; and
   an angle adjusting means for adjusting the angle of said cursor member;
   wherein said angle adjusting means comprises, a pivot member rotatably projecting through said support member bore, a cam member engaging said longitudinal opening and affixed to one end of said pivot member, a knob affixed to the other end of said pivot member for turning said cam member and adjusting the angle of said cursor member a friction member located between the confronting faces of said knob and said support member for preventing the rotation of said cursor member under the influence of gravity, said cursor pole comprises a channel shaped vertical rail which is separably mounted to said screen along a side leg thereof, and said support member includes a tip portion which includes a laterally enlarged split head registering with said channel and resiliently fitting the confronting side faces thereof, whereby said support member is normally retained in a preset vertical position along said rail while the vertical slidable adjustment of said support member along said rail is permitted.

6. A cursor mechanism for use in a microfilm reader having a vertically extending rectangular projection screen and a rectangular frame surrounding said screen, comprising:
   a cursor member extending laterally across and proximate to and parallel to the plane of said screen and having a longitudinal cam edge proximate one end thereof;
   a support member swingably mounting said cursor member by means of a pivot and having a longitudinal slot;
   a cursor pole provided along one side of said screen frame for vertically slidably supporting said support member; and
   an angle adjusting means for adjusting the angle of said cursor member;
   wherein said angle adjusting means comprises a slide member slidable along and projecting through said longitudinal slot, a transmission member engaging said cam edge and affixed to one end of said slide member, a knob affixed to the other end of said slide member for shifting said slide and transmission members and adjusting the angle of said cursor member, and a friction member located between the confronting faces of said knob and said support member for preventing the rotation of said cursor member under the influence of gravity, said cursor pole comprises a channel shaped vertical rail which is separably mounted to said screen along a side leg thereof, and said support member includes a tip portion which includes a laterally enlarged split head registering with said channel and resiliently fitting the confronting side faces thereof, whereby said support member is normally retained in a preset vertical position along said rail while the vertical slidable adjustment of said support member along said rail is permitted.

* * * * *